(12) United States Patent
Bartolutti et al.

(10) Patent No.: US 6,424,710 B1
(45) Date of Patent: Jul. 23, 2002

(54) METHOD AND DEVICE FOR DETECTING THE PRESENCE OF A PATCH CORD CONNECTOR IN A TELECOMMUNICATIONS PATCH SYSTEM USING PASSIVE DETECTION SENSORS

(75) Inventors: Stephen Craig Bartolutti, Suwanee, GA (US); Golam Mabud Choudhury, Warren Tonship, Someset County, NJ (US); Lyndon D. Ensz, Omaha, NE (US); Michael Gregory German, Secaucus, NJ (US); Daniel Warren Macauley, Fishers, IN (US); Lawrence Marc Paul, Randolph, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/247,237

(22) Filed: Feb. 10, 1999

(51) Int. Cl.[7] ................................................. H04M 3/00
(52) U.S. Cl. ....................................................... 379/326
(58) Field of Search ................................. 379/438, 326; 439/490, 344, 910; 340/540, 815.45, 539

(56) References Cited

U.S. PATENT DOCUMENTS

| 3,573,789 A | 4/1971 | Sharp et al. |
|---|---|---|
| 3,573,792 A | 4/1971 | Reed |
| 5,111,408 A | 5/1992 | Amjadi |
| 5,790,041 A | * 8/1998 | Lee ............................ 439/490 |
| 6,002,331 A | 12/1999 | Laor |
| 6,067,014 A | * 5/2000 | Wilson ....................... 340/540 |

FOREIGN PATENT DOCUMENTS

WO       9602888       2/1996

* cited by examiner

*Primary Examiner*—Jack Chiang

(57) ABSTRACT

A patch cord tracing system for tracing patch cords in a telecommunications patching system. The system includes a plurality of tracing interface modules that attach to the patch panels in a telecommunications closet. On the patch panels in a telecommunications closet are located a plurality of connector ports that receive the terminated ends of patch cords. The tracing interface modules mount to the patch panels and provide a passive sensor that can detect when a patch cord connector has been added to, or removed from, a connector port within the telecommunications closet. Accordingly, by connecting a computer controller to the various passive sensors, the computer can monitor and log all changes to the patch cord interconnections in an automated fashion. In alternate embodiments, the passive sensors can be built into the structure of the patch port assemblies that contain the various connector ports. Such alternate embodiments are for newly manufactured telecommunication patch systems and are not readily adapted to existing systems.

18 Claims, 4 Drawing Sheets

METHOD AND DEVICE FOR DETECTING THE PRESENCE OF A PATCH CORD CONNECTOR IN A TELECOMMUNICATIONS PATCH SYSTEM USING PASSIVE DETECTION SENSORS

RELATED APPLICATIONS

This application is related to the following co-pending applications, the disclosures of which are incorporated into this specification by reference.

U.S. patent application Ser. No. 09/247,613, entitled SYSTEM AND METHOD FOR ADDRESSING AND TRACING PATCH CORDS IN A DEDICATED TELECOMMUNICATIONS SYSTEM;

U.S. patent application Ser. No. 09/247,613, entitled SYSTEM AND METHOD FOR OPERATION FOR A TELECOMMUNICATIONS PATCH SYSTEM;

U.S. patent application Ser. No. 09/347,269; entitled TRACING INTERFACE MODULE FOR PATCH CORDS IN A TELECOMMUNICATIONS PATCH SYSTEM;

U.S. patent application Ser. No. 09/247, 385, entitled DISPLAY PANEL OVERLAY STRUCTURE AND METHOD FOR TRACING INTERFACE MODULES IN A TELECOMMUNICATIONS PATCH SYSTEM;

U.S. patent application Ser. No. 09/247,270, entitled SYSTEM AND METHOD FOR IDENTIFYING SPECIFIC PATCH CORD CONNECTORS IN A TELECOMMUNICATIONS PATCH SYSTEM; AND U.S. patent application Ser. No. 09/404,619, U.S. Pat. No. 3,222,908 entitled SYSTEM AND METHOD FOR INTERCONNECTING TRACING INTERFACE MODULES TO A CENTRAL CONTROLLER IN A TELECOMMUNICATIONS PATCH SYSTEM.

BACKGROUND OF THE INVENTION

1. Field of the Invention

In general, the present invention relates to telecommunications patching systems that are used to selectively interconnect various telecommunications lines to one another with patch cords. More particularly, the present invention relates to telecommunication patching systems that embody patch cord tracing capabilities that help a technician locate the opposite ends of a specific patch cord within the system.

2. Description of the Prior Art

Many businesses have dedicated telecommunication systems that enable computers, telephones, facsimile machines and the like to communicate with each other, through a private network, and with remote locations via a telecommunications service provider. In most buildings, the dedicated telecommunications system is hard wired using telecommunication cables that contain conductive wire. In such hard wired systems, dedicated wires are coupled to individual service ports throughout the building. The wires from the dedicated service ports extend through the walls of the building to a telecommunications closet or closets. The telecommunications lines from the interface hub of a main frame computer and the telecommunication lines from external telecommunication service providers are also terminated within the telecommunications closets.

A patching system is used to interconnect the various telecommunication lines within the telecommunications closet. In a telecommunications patching system, all of the telecommunication lines are terminated within the telecommunications closet in an organized manner. The organized terminations of the various lines are provided via the structure of the telecommunications closet. Within the telecommunications closet is typically located a mounting frame. On the mounting frame is connected a plurality of racks. The telecommunications lines terminate on the racks, as is explained below.

Referring to FIG. 1, a typical prior art rack 10 is shown. The rack 10 retains a plurality of patch panels 12 that are mounted to the rack 10. On each of the patch panels 12 are located port assemblies 14. The port assemblies 14 each contain six RJ-45 telecommunication connector ports 16.

Each of the different telecommunication connector ports 16 is hard wired to one of the system's telecommunications lines. Accordingly, each telecommunications line is terminated on a patch panel 12 in an organized manner. In small patch systems, all telecommunications lines may terminate on the patch panels of the same rack. In larger patch systems, multiple racks are used, wherein different telecommunications lines terminate on different racks.

In the shown embodiment of FIG. 1, the interconnections between the various telecommunications lines are made using patch cords 20. Both ends of each patch cord 20 are terminated with connectors 22, such as an RJ-45 telecommunication connector or a RJ-11 telecommunications connector. One end of the patch cord 20 is connected to the connector port 16 of a first telecommunications line and the opposite end of the cord is connected to the connector port 16 of a second telecommunications line. By selectively connecting the various lines the patch cords 20, any combination of telecommunications lines can be interconnected.

In many businesses, employees are assigned their own computer network access number exchange so that the employee can interface with the companies main frame computer or computer network. When an employee changes office locations, it is not desirable to provide that employee with new exchange numbers. Rather, to preserve consistency in communications, it is preferred that the exchanges of the telecommunication connection ports in the employee's old office be transferred to the telecommunications ports in the employees new office. To accomplish this task, the patch cords in the telecommunication closet are rearranged so that the employee's old exchanges are now received in his/her new office.

As employees, move, change positions, add lines and subtract lines, the patch cords in a typical telecommunications closet are rearranged quite often. The interconnections of the various patch cords in a telecommunications closet are often logged in either paper or computer based log. However, technicians often neglect to update the log each and every time a change is made. Inevitably, the log is less than 100% accurate and a technician has no way of reading where each of the patch cords begins and ends. Accordingly, each time a technician needs to change a patch cord, that technician manually traces that patch cord between two connector ports. To preform a manual trace, the technician locates one end of a patch cord. The technician then manually follows the patch cord until he/she finds the opposite end of that patch cord. Once the two ends of the patch cord are located, the patch cord can be positively identified.

It takes a significant amount of time for a technician to manually trace a particular patch cord. Furthermore, manual tracing is not completely accurate and technicians often accidently go from one patch cord to another during a manual trace. Such errors result in misconnected telecommunication lines which must be later identified and corrected.

In order for a tracing system to work in an automated fashion, the tracing system must embody some mechanism for automatically detecting when a patch cord has been added to or detached from a specific connector port. In co-pending patent application Ser. No. 09/247,270, entitled, Method And Device For Detecting The Presence Of A Patch Cord Connector In A Telecommunications Patch System, a tracing system is disclosed that used mechanical switches and linkages to detect the presence or absence of a patch cord in a connector port. Although the mechanical switches can be effectively used to detect the presence or absence of a patch cord in a connector port, mechanical switches contain parts that wear out over time. Accordingly, mechanical based systems must be periodically maintained or replaced.

Furthermore, mechanical switches are positioned in fixed locations. Accordingly, theses switches can only detect patch cords having end terminations of a specific shape. If different patch cords are used, the mechanical switches may not be activated by the different patch cord. All the mechanical switches would then have to be replaced or adjusted.

A need therefore exists in the field of telecommunication patching systems for a system that can trace, detect and identify the ends of each patch cord in a telecommunications closet in an automated fashion, without using mechanical switches that can wear out over time or become obsolete by a change in patch cord design.

SUMMARY OF THE INVENTION

The present invention is part of patch cord tracing system for tracing patch cords in a telecommunications patching system. The system includes a plurality of tracing interface modules that attach to the patch panels in a telecommunications closet. On the patch panels in a telecommunications closet are located a plurality of connector ports that receive the terminated ends of patch cords. The tracing interface modules mount to the patch panels and provide a passive sensor that can detect when a patch cord connector has been added to, or removed from, a connector port within the telecommunications closet. Accordingly, by connecting a computer controller to the various passive sensors, the computer controller can monitor and log all changes to the patch cord interconnections in an automated fashion.

In alternate embodiments, the passive sensors can be built into the structure of the patch port assemblies that contain the various connector ports. Such alternate embodiments are for newly manufactured telecommunication patch systems and are not readily adapted to existing systems.

BRIEF DESCRIPTION OF THE DRAWINGS

For a better understanding of the present invention, reference is made to the following description of an exemplary embodiment thereof, considered in conjunction with the a accompanying drawings, in which.

DETAILED DESCRIPTION OF THE DRAWINGS

Figure 1:
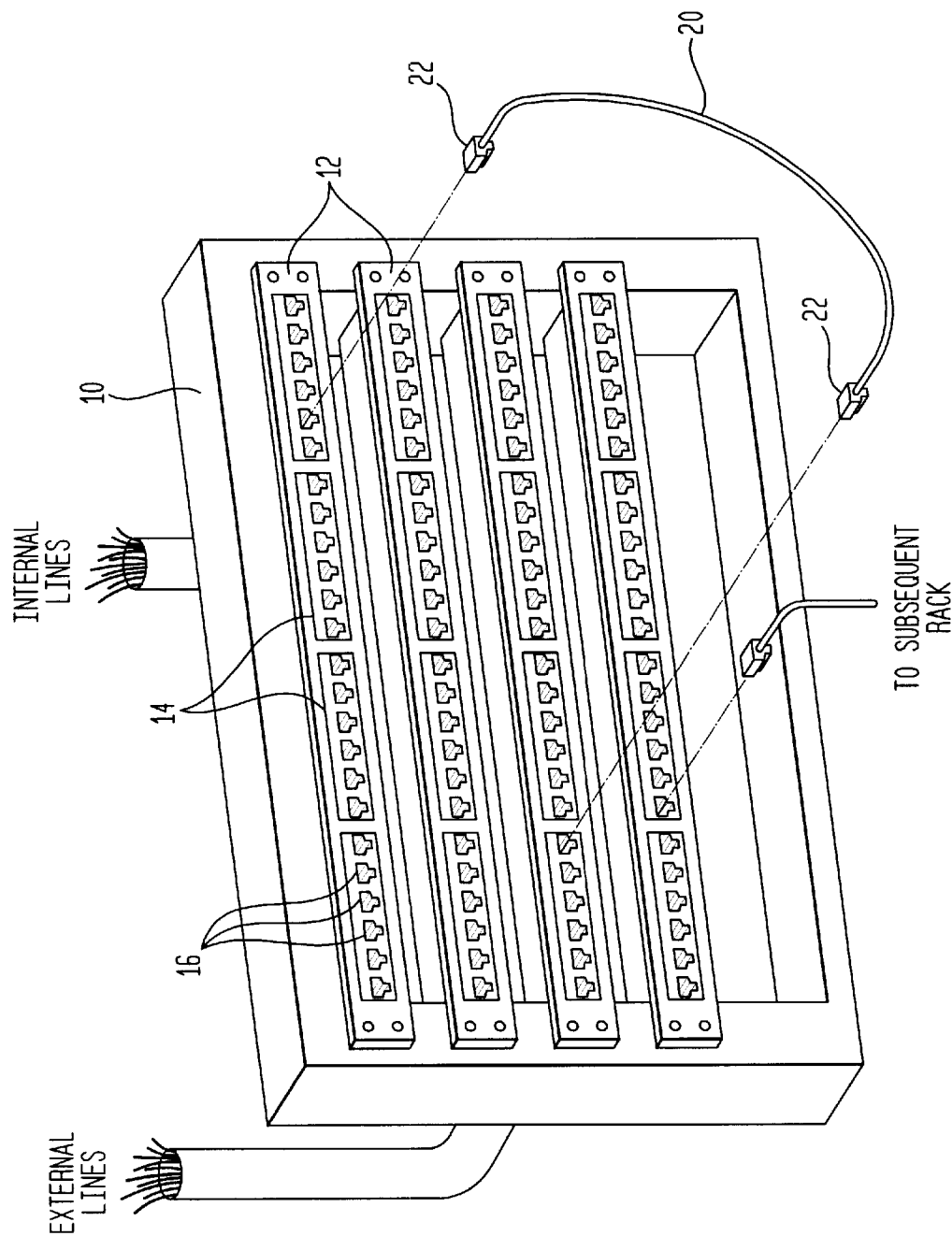
FIG. 1 is a perspective view of a typical prior art telecommunications rack assembly containing multiple patch panels with connector ports that are selectively interconnected by patch cords.
Figure 2:
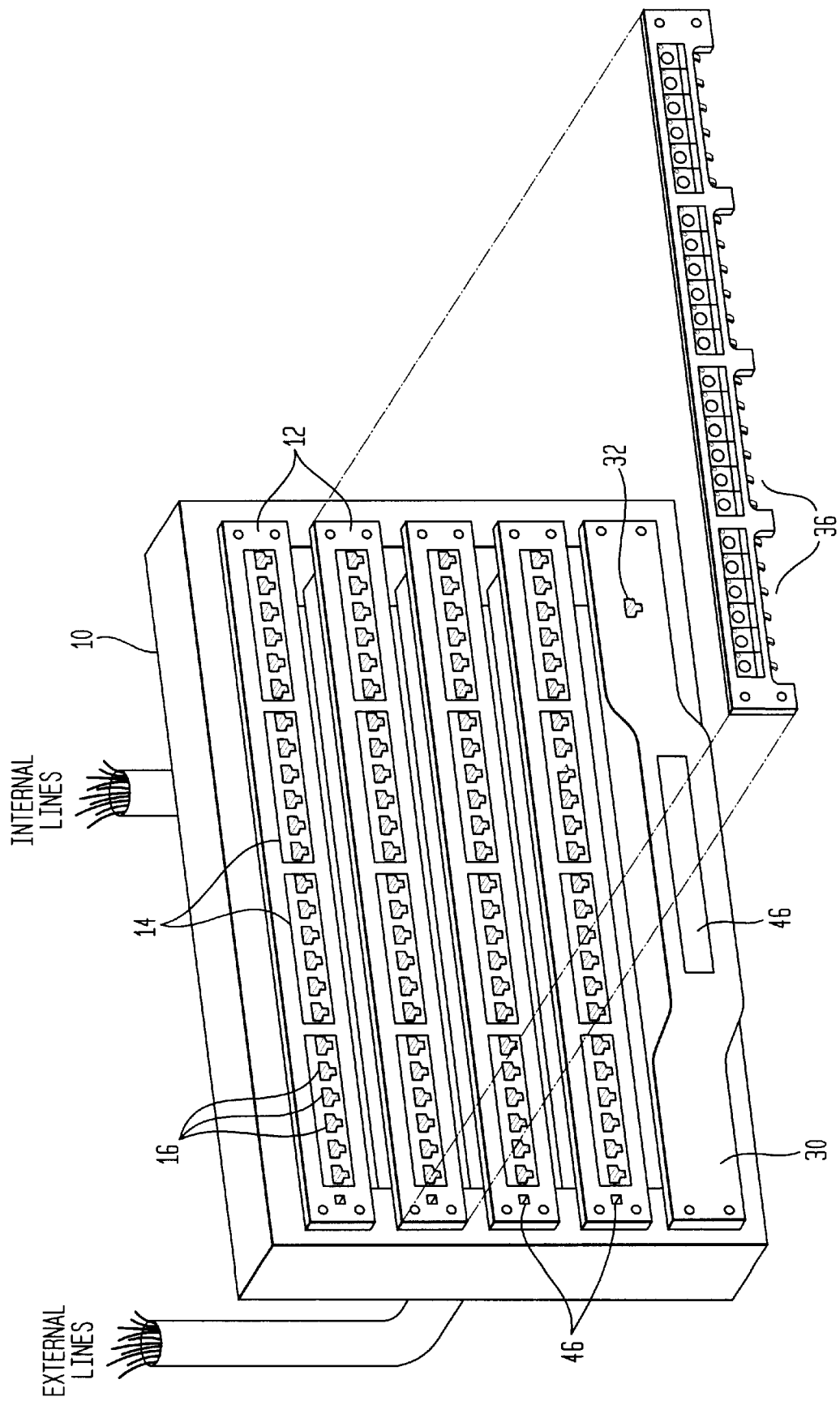
FIG. 2 is a perspective view of a tracing interface module and rack controller in accordance with the present invention, shown in conjunction with the prior art telecommunications rack assembly of FIG. 1.

Referring to FIG. 2, a conventional telecommunications rack 10 is shown, such as the one previously described in regard to FIG. 1. The telecommunications rack 10 contains a plurality of patch panels 12 that are mounted in parallel horizontal rows within the rack 10. Each of the patch panels 12 contains a plurality of patch port assemblies 14. The connector ports 16 associated with each of the patch port assemblies 14 are hard wired to the various telecommunications lines that enter the telecommunications closet.

In the present invention system, a rack controller 30 is mounted to each rack 10 in the overall patch system. The rack controller 30 contains a central processing unit (CPU). The CPU is capable of independently running line tracing programs and also contains a remote access port 32 that enables the CPU to be accessed by a remote computer. Remote access of the rack controller is the subject of related co-pending patent application Ser. No. 09/247,614, entitled System And Method Of Operation For A Telecommunications Patch System, which has already been incorporated into this application by reference.

The purpose of the rack controller 30 is to operate and gather data from the various tracing interface modules 34, as will be later explained. The tracing interface modules 34 are modules that mount to the face of each patch panel 12 on the rack 10. The tracing interface modules 34 surround the various connector ports 16 located on a patch panels 12 and provide an interface through which data about each connector port 16 can be transmitted to and from the rack controller 30.

The tracing interface module 34 can have multiple different configurations. The structure and different configurations of the tracing modules are disclosed in related co-pending patent application Ser. No. 09/247,269, entitled Tracing Interface Module For Patch Cords In A Telecommunications Patch System; patent application Ser. No. 09/247,385, entitled Display Panel Overlay Structure And Method For Tracing Interface Modules In A Telecommunications System; and patent application Ser. No. 09/247,270, entitled Method And Device For Detecting The Presence Of A Patch Cord Connector In A Telecommunications Patch System. These applications have already been incorporated into this application by reference.

In the shown embodiment, the tracing interface module 34 contains a rectangular relief 36 that surrounds the connector ports 16 on each patch port assembly 14 when the tracing interface module 34 is connected to the patch panels 12. Located within the tracing interface module 34 are passive detectors that detect the presence or absence of a patch cord in each of the connector ports 16.

Figure 3:
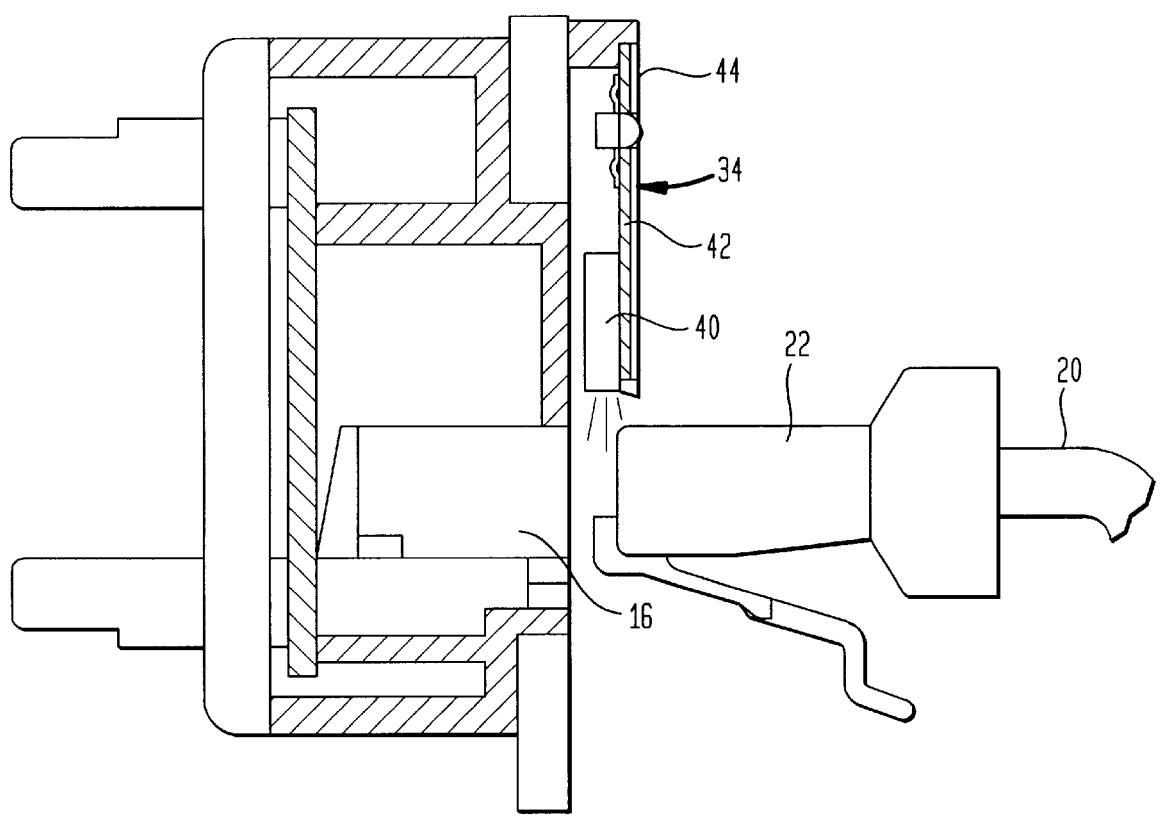
FIG. 3 is a cross-sectional view of a patch port assembly and tracing interface module, wherein the tracing interface module contains a passive sensor.

Referring to FIG. 3, it can be seen that the tracing interface module supports an electro-magnetic transceiver 40 directly above each of the connector ports 16. The electromagnetic transceiver 40 can have multiple configurations, however the function of the electromagnetic transceiver 40 remains the same. The electro-magnetic transceiver 40 emits a beam of electromagnetic radiation downwardly in front of the connector port 16. The electromagnetic radiation can be visible light, infrared light, ultraviolet light or ultrasonic energy. If no patch cord connector 22 is present, the emitted electromagnetic energy passes into space and is not reflected back toward the electromagnetic transceiver 40. However, if a patch cord connector is present within the connector port 16, some of the emitted electromagnetic radiation will reflect off of the patch cord connector and will bounce back to the electromagnetic transceiver 40.

The electromagnetic transceiver 40 contains a detector capable of detecting the electro-magnetic radiation reflected back to the transceiver 40. If the amount of light reflected back to the transceiver 40 surpasses a predetermined threshold for a predetermined period of time, then the presence of a patch cord connector 22 can be confirmed.

Each electro-magnetic transceiver 40 is monitored by the rack controller 30 (FIG. 2). The rack controller is therefore capable of automatically determining when a patch cord 20 has been added to, or removed from, any connector port 16 on the rack. Accordingly, when a patch cord connector 22 is placed into any connector port 16, or removed from any connector port 22, that change is sensed by the electromagnetic transceiver and is read to the rack controller 30 (FIG. 2). The rack controller is therefore capable of monitoring any and all changes that occur to the patch cords in the patch system over time. The rack controller is also capable of automatically keeping an accurate log of all changes that have occurred to the patch cords since the installation of the present invention system. Accordingly, if a technician is servicing the patch system, that technician can read the accurate log straight from the rack controller. The log can be read out on the display 46 (FIG. 2) of the rack controller or can be remotely accessed via the connector port 32 (FIG. 2) on the rack controller.

The use of the electromagnetic transceiver 40 is only one way of passively sensing when a patch cord connector 22 has been added to or removed from a connector port 16. By positioning the electromagnetic transceiver 40 within the tracing interface module 34, the passive sensing device can be retroactively added to many existing telecommunication patch systems.

The tracing interface module 34 is comprised of a support frame, a printed circuit board 42 and a graphics overlay 44. The electronic components of the electro-magnetic transceiver 40 can be deigned into, and supported by, the structure of the printed circuit board. A complete description of the structure of components comprising the tracing interface module 34 is disclosed in co-pending patent application Ser. No. 09/247,269,entitled, Tracing Interface Module For Patch Cords In A Telecommunications Patch System, which has already been incorporated into this specification by reference.

Although a tracing system can be retroactively added to existing telecommunications patch system by utilizing trace interface modules, new telecommunications patch systems can be manufactured with tracing capabilities already built in. In such a new design, the features of the tracing interface module can be incorporated into the design of the patch port assemblies 14 (FIG. 2) present on the patch panel 12 (FIG. 2).

Figure 4:
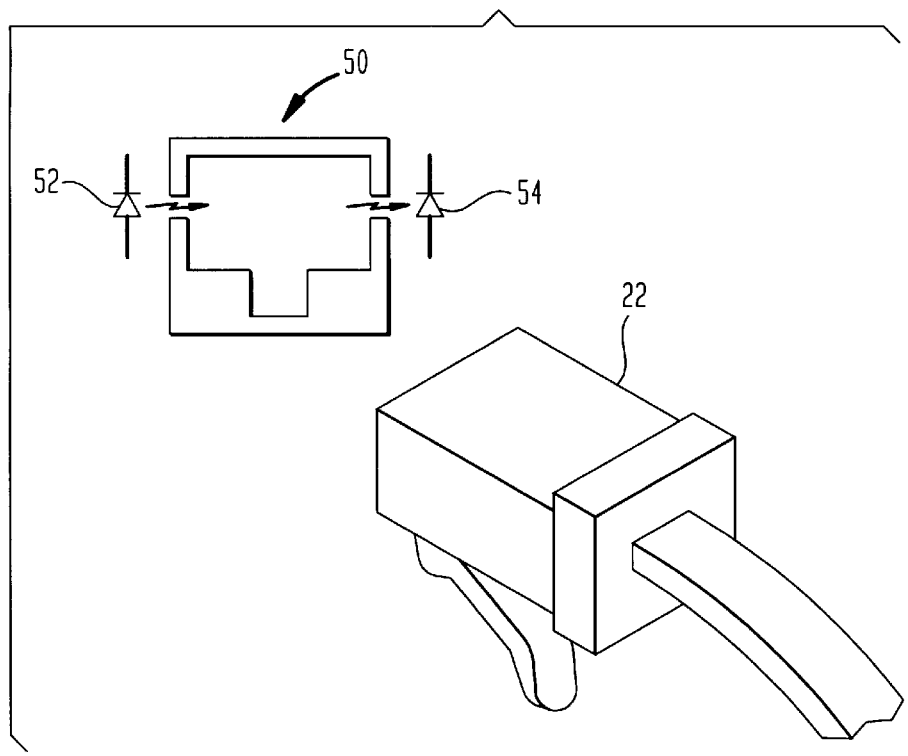
FIG. 4 is a schematic view of an alternate embodiment of a passive sensor contained within a connector port.

Referring to FIG. 4, a schematic of an exemplary connector port design 50 is shown. In the shown design, it can be seen that an light emitting diode (LED) 52 is positioned on one side of the connector port 50. A photodiode 54 is positioned on the opposite side of the connector port 50. Apertures are formed in the structure of the connector port 50 so that a clear pathway exists in between the LED 52 and the photodiode 54.

When no patch cord connector 22 is present within the connector port 50, the photodiode 54 receives the light emitted from the LED 52. However, when the patch cord connector 22 is inserted into the connector port 16, the patch cord connector obstructs the pathway of light.

By coupling the photodiode 54 to the rack controller 30 (FIG. 2), the rack controller 30 can determine whether or not a particular connector port 16 contains a patch cord connector 22.

Figure 5:
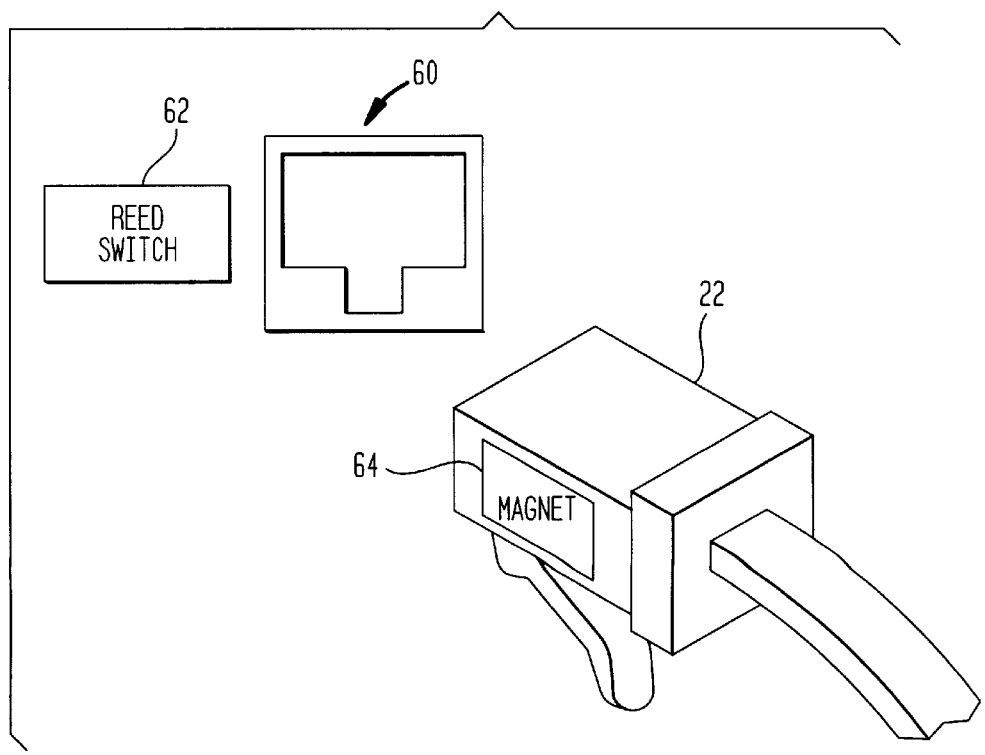
FIG. 5 is a schematic view of an alternate embodiment of a passive sensor contained within a connector port.

Referring to FIG. 5, a schematic of another exemplary connector port design 60 is shown. In the shown design, it can be seen that a reed switch 62 is positioned on one side of the connector port 60. The reed switch is connected to the rack controller 30 (FIG. 2). When no patch cord connector 22 is present within the connector port 60, the state of the reed switch 62 remains constant, i.e. either open or closed.

The patch cord connector 22 in the shown embodiment contains a magnetic element 64. When the patch cord connector 22 is inserted into the connector port 60, the magnetic element 64 passes next to the reed switch 62. Accordingly, when the patch cord connector 22 is inserted into the connector port 60, the magnetic element 64 on the patch cord connector 22 changes the state of the reed switch 62.

By coupling the reed switch 62 to the rack controller 30 (FIG. 2), the rack controller 30 can determine whether or not a particular connector port 60 contains a patch cord connector 22.

In addition to keeping an accurate log of all physical patch cord changes, the present invention system can also be used to accurately trace the end points of any patch cord 20 (FIG. 1). For instance, suppose a technician wants to find the opposite end of a particular patch cord. That technician can remove a patch cord connector from a particular connector port. Once a patch cord connector is removed, the passive sensor in that connector port reads the change to the rack controller. The rack controller can then identify the opposite end of the cord that was removed.

It will be understood that the embodiment of the present invention specifically shown and described is merely exemplary and that a person skilled in the art can make alternate embodiments using different configurations and functionally equivalent components. For example, the shown positions of the various passive sensors can be altered from the positions that are specifically shown. All such alternate embodiments are intended to be included in the scope of this invention as set forth in the following claims.

What is claimed is:

1. A patch cord tracing module assembly adapted to be affixed to a patch panel having a plurality of connector ports provided in patch cord port assemblies forming a front planar surface in the patch panel, said patch cord tracing module adapted to detect the presence of patch cords having connectors that are connected to the connector ports in a telecommunications system, comprising:

a printed circuitboard containing a plurality of sensors thereon, each of said sensors being mounted and electrically connected to said circuitboard so as to align in close proximity to each of the plurality of connector ports wherein said sensors are capable of detecting the presence of a patch cord a predetermined distance away from said sensor without physically engaging that patch cord, said printed circuitboard generally forming a plane that is parallel to the front planar surface of a patch panel.

2. The assembly according to claim 1, wherein each of said sensors contains an emitter that emits electro-magnetic energy.

3. The assembly according to claim 1, wherein said sensors contain an emitter selected from a group consisting of light emitters, infrared light emitters, ultraviolet light emitters and ultrasonic emitters.

4. The assembly according to claim 2, wherein each of said sensors includes an electromagnetic energy detector that is capable of detected reflections of the electromagnetic energy emitted by said emitter, provided said reflections surpass a predetermined threshold energy level.

5. The assembly according to claim 1, wherein said sensor is capable of detecting a magnetic field.

6. A telecommunications patching system having point-to-point tracing capabilities for patch cords, comprising:

a patch panel having a plurality of connector ports formed in a first plane adapted to receive patch cords having connectors that are connected to the connector ports;

a tracing module mounted to said patch panel proximate said connector ports, said tracing module having a printed circuitboard having affixed thereto a plurality of sensors electrically connected to said circuitboard, said tracing module being in a second plane generally parallel to said first plane wherein said tracing module contains sensors that detect the presence of a patch cord in each connector port without physically contacting that patch cord.

7. The system according to claim 6, further including a controller on each said rack structure that is coupled to each of said sensor in said tracing modules.

8. The system according to claim 6, wherein said sensors contains an emitter that emits electromagnetic energy.

9. The system according to claim 6, wherein said sensors contain an emitter selected from a group consisting of light emitters, infrared light emitters, ultraviolet light emitters and ultrasonic emitters.

10. The system according to claim 8, wherein each of said sensors includes an electromagnetic energy detector that is capable of detected reflections of the electromagnetic energy emitted by said emitter, provided said reflections surpass a predetermined threshold energy level.

11. The system according to claim 6, wherein said sensor is capable of detecting a magnetic field.

12. The system according to claim 11, wherein each said patch cord has terminated ends that contain magnetized elements.

13. A telecommunications patching system having point-to-point tracing capabilities, comprising:

a patch panel having a front surface having a plurality of connector ports formed in said front surface, said connector ports adapted to receive patch cords to interconnect pairs of said connector ports, a tracing module mounted to said patch panels proximate said connector ports, said tracing module including a member having a rear surface facing said front surface of said patch panel when said tracing module is mounted to said patch panel, and a plurality of sensors mounted to the rear surface of said member so as to position said sensors between said member and said front surface of said patch panel so that said member provides a protective environment for said sensors, each sensor adapted to detect the presence of a patch cord in a connector port without physically contacting that patch cord.

14. A telecommunications patching system as defined in claim 13 wherein said member is a printed circuitboard.

15. A telecommunications patching system as defined in claim 14 wherein said printed circuitboard further has a front surface and a graphics overlay overlying said front surface of said printed circuitboard.

16. A telecommunications patching system as defined in claim 13 wherein said patch panel is in a first plane and said tracing module is in a second plane generally parallel to said first plane.

17. A telecommunications patching system as defined in claim 14 wherein said printed circuitboard has opposite outer edges and a member mounts said printed circuitboard along one outer edge thereof and said sensors are mounted near the other outer edge of said printed circuitboard.

18. A telecommunications patching system as defined in claim 16 wherein said sensors are recessed from the other outer edge of said printed circuitboard.

\* \* \* \* \*